: US008064363B2

United States Patent
Kohvakka et al.

(10) Patent No.: US 8,064,363 B2
(45) Date of Patent: Nov. 22, 2011

(54) ENERGY-EFFICIENT NEIGHBOR DISCOVERY FOR MOBILE WIRELESS SENSOR NETWORKS

(75) Inventors: Mikko Kohvakka, Tampere (FI); Jukka Suhonen, Tampere (FI); Marko Hännikäinen, Pirkkala (FI); Timo D. Hämäläinen, Kangasala (FI)

(73) Assignee: Wirepas Oy (FI)

( * ) Notice: Subject to any disclaimer, the term of this patent is extended or adjusted under 35 U.S.C. 154(b) by 94 days.

(21) Appl. No.: 12/312,112

(22) PCT Filed: Nov. 6, 2007

(86) PCT No.: PCT/FI2007/000267
§ 371 (c)(1),
(2), (4) Date: Apr. 27, 2009

(87) PCT Pub. No.: WO2008/056023
PCT Pub. Date: May 15, 2008

(65) Prior Publication Data
US 2010/0110930 A1    May 6, 2010

(30) Foreign Application Priority Data
Nov. 7, 2006  (FI) ...................................... 20060979

(51) Int. Cl.
*H04W 56/00* (2009.01)
*H04L 12/28* (2006.01)
(52) U.S. Cl. ......................... 370/254; 370/216; 370/509
(58) Field of Classification Search ................... 370/254
See application file for complete search history.

(56) References Cited

U.S. PATENT DOCUMENTS

| 6,456,599 | B1 | 9/2002 | Elliott | |
| 7,675,863 | B2* | 3/2010 | Werb et al. | 370/241 |
| 2002/0044533 | A1 | 4/2002 | Bahl | |
| 2002/0193072 | A1* | 12/2002 | Alinikula et al. | 455/41 |
| 2004/0042434 | A1 | 3/2004 | Kennedy | |
| 2005/0064818 | A1* | 3/2005 | Assarsson et al. | 455/41.2 |
| 2005/0288069 | A1 | 12/2005 | Arunan | |
| 2007/0047510 | A1* | 3/2007 | Cho et al. | 370/338 |

OTHER PUBLICATIONS

Ye, W. et al., "Medium Access Control With Coordinated Adaptive Sleeping for Wireless Sensor Networks' IEEE/ACM Transactions on Networking", vol. 12 No. 3, pp. 493-506. Jun. 2004, koko julkaisu.

* cited by examiner

*Primary Examiner* — Jason Mattis
*Assistant Examiner* — Stephen J Clawson
(74) *Attorney, Agent, or Firm* — Wood, Phillips, Katz, Clark & Mortimer

(57) ABSTRACT

A node device (601) of a wireless sensor network comprises a receiver (651) for receiving transmissions from other nodes. A controller (641) selectively switches on said receiver (651) according to a timetable. The node device (601) maintains synchronization with and receives beacon transmissions from another node in said wireless sensor network. If a failure is observed in previously maintained synchronization, the controller (641) reads from memory previously received information about neighboring nodes with which said node device (601) did not yet maintain synchronization. The controller (641) utilizes such stored information to selectively switch on the receiver (651) to attempt receiving a beacon transmission from such a neighboring node.

14 Claims, 7 Drawing Sheets

ENERGY-EFFICIENT NEIGHBOR DISCOVERY FOR MOBILE WIRELESS SENSOR NETWORKS

TECHNICAL FIELD

The invention concerns generally the technology of wireless sensor networks. Especially the invention concerns the technology of enhancing node mobility in wireless sensor networks without significantly increasing power consumption.

BACKGROUND OF THE INVENTION

The concept of a wireless sensor network (WSN) refers to a communications network that comprises a (potentially large) number of autonomous nodes that are capable of setting up and maintaining multi-hop wireless communication connections through an randomly deployed arrangement of nodes. Contrary to general-purpose ad-hoc wireless networks such as WLANs (Wireless Local Area Networks), a WSN does not aim at maximizing wireless medium utilization or at ensuring highest possible data rates. A major concern in WSNs is the long-term power consumption of the nodes, which means that even relatively modest data rates and relatively long latencies may be accepted if they help to minimize the mean amount of consumed electric power. The word "sensor" in WSNs comes from the fact that traditionally a major application area of WSNs was considered to be relative static measurement networks, in which a large number of sensor-equipped nodes act as source nodes generating measurement data, which is collected to a relatively small number of sink nodes. The sink nodes may also act as gateways that set up and maintain communications between the WSN and other communications networks.

Prior art of WSNs and related features are known at least from publications WO2006/067271, US 2004/0100917 A1, US 2003/0152041 A1, US 2002/0044533 A1, CA 2 311 245 A1, WO01/69279, WO01/26329, and U.S. Pat. No. 6,208,247 B1. Known protocols for wireless sensor networks include the Sensor-MAC (also known as S-MAC), the Self-organizing Medium Access Control for Sensor networks (SMACS), the Traffic Adaptive Medium Access (TRAMA) protocol, and the IEEE 802.15.4 Low Rate Wireless Personal Area Network (LR-WPAN) standard. Of these, the S-MAC has been described in the scientific publication W. Ye, J. Heidemann, and D. Estrin: "Medium access control with coordinated, adaptive sleeping for wireless sensor networks," ACM/IEEE Trans. Networking, vol. 12, no. 3, pp. 493-506, June 2004. SMACS has been described in K. Sohrabi, J. Gao, V. Ailawadhi, and G. J. Pottie, "Protocols for self-organization of a wireless sensor network," IEEE Personal Communications, vol. 7, no. 5, pp. 16-27, Oct. 2000. TRAMA is described in V. Rajendran, K. Obraczka, and J. J. Garcia-Luna-Aceves, "Energy-efficient, collision-free medium access control for wireless sensor networks," in Wireless Networks, vol. 12, no. 1, February 2006, pp. 63-78. A further development to LR-WPAN is known as the ZigBee and described online on the official website of the ZigBee alliance (http://www.zigbee.org).

Aiming at ultimate savings in the energy needed to operate a node typically means that wireless communications in a WSN consist of short activity periods and long idle periods, during which most electric circuits in the node are in a sleep mode. Keeping the activity period short is easy, when timing is synchronized throughout the network and each node knows its immediately neighboring nodes. These assumptions hold reasonably well if mobility of nodes is low. Problems arise if the network should support highly mobile nodes, which may be the case for example in applications like access control, assets tracking, and interactive games.

FIG. 1 illustrates schematically the transmission of data between a source node and a destination node in a WSN utilizing a synchronous MAC (Medium Access Control) protocol. Here "destination" does not necessarily mean the final destination of data; this example only shows transmission of data between two nodes that are within each other's radio coverage. White blocks indicate transmission and reception of beacon signals. A simple hatch indicates a period when data reception is possible (the receiver is on), and a cross hatch indicates transmission of data. The beacon transmission 101 of the destination node is received at the source node in 102. According to the principles known from e.g. publication WO2006/067271, the beacon transmission contains all the information that the source node needs to know about the destination node in order to successfully transmit data thereto. After the beacon transmission 101 there occurs a data reception period 103 in the destination node. The source node utilises this to make its data transmission at 104. The same pattern is repeated at steps 111, 112, 113, and 114. In the meantime the source node may make its own beacon transmission at 105, and have a reception period 106. These are not necessary, if the source node is a so-called subnode of the destination node.

FIG. 1 also illustrates the concepts of a wakeup period $T_{wakeup}$, which consists of an active period $T_{active}$ and a sleep period $T_{sleep}$. For reasons of graphical clarity the relative lengths of the time periods are not realistic in FIG. 1. Typically the length of the active period $T_{active}$ is considerably less than one second, while the sleep period $T_{sleep}$ may be several seconds or even minutes.

The fact that the MAC protocol is synchronous means that the source node knows, when it may expect the beacon transmission 101 to come, so that the source node only needs to keep its receiver on for receiving beacon signals at that very moment. The source node has obtained the necessary information earlier by performing a so-called network scan. In principle the source node would not even need to receive the beacon transmission at 102 or at least not at 112, if it can deduce the appropriate moment for transmitting data to the destination node from some beacon signal it has previously received from the destination node. However, it is usually advisable to receive all beacon signals, because they can also contain up-to-date information about the reservation of slots by other nodes during the reception period 103 or 113, or other actual information. Regularly receiving beacon transmissions also helps to compensate for random errors in clock frequency between nodes.

Let us imagine that the source node moves, and eventually goes out of the radio coverage of the destination node. In that case the source node should find some other node close enough to its new location to communicate with. In other words the source node must make a network scan. Even if there is a common network beacon frequency on which all beacon transmissions are made, in the worst case the source node must keep its beacon receiver on for the duration of a whole wakeup period to receive even a single beacon transmission. The on-time of the receiver that is required for performing a network scan becomes even longer, if the node must listen to a number of frequencies in sequence. The more mobility there is among the nodes, the more frequent will be the need for scanning the network, which may dramatically increase the overall energy consumption of a WSN.

An objective of the present invention is to present a method, an arrangement and a computer program product for enhancing the support for mobility in a WSN without considerably increasing the overall energy consumption of the network. Another objective of the invention is that the enhanced support for mobility can be implemented in the framework of existing WSN protocols without requiring major changes. A yet another objective invention is to keep the requirements for hardware complicatedness at nodes reasonable despite of the enhanced support for mobility.

The objectives of the invention are achieved by including information about second-hop neighbor nodes in beacon transmissions, and by utilising previously received information about second-hop neighbors when creating new connections.

According to a first aspect of the invention, a node device for a wireless sensor network comprises:
- a receiver for receiving transmissions from other nodes in said wireless sensor network,
- a controller configured to selectively switch on said receiver according to a timetable known to said controller, and
- a memory configured to store information about other nodes in said wireless sensor network;

wherein said node device is configured to maintain synchronization with and receive beacon transmissions from another node in said wireless sensor network.

As a characterizing feature said controller is configured to read from received beacon transmissions information about neighboring nodes with which said node device does not maintain synchronization and to store such information into said memory, and said controller is configured to utilize such stored information to selectively switch on said receiver to attempt receiving a beacon transmission from such a neighboring node as a response to an observed failure in previously maintained synchronization.

According to a second aspect of the invention, a node device for a wireless sensor network comprises:
- a receiver for receiving transmissions from other nodes in said wireless sensor network,
- a transmitter for making transmissions to other nodes in said wireless sensor network, and
- a controller configured to selectively switch on said receiver and said transmitter according to a timetable known to said controller;

wherein said node device is configured to maintain synchronization with and receive beacon transmissions from another node in said wireless sensor network.

As a characterizing feature said controller is configured to compose a synchronization data unit that contains information about such node with which said node device maintains synchronization, and said controller is configured to make said transmitter transmit said synchronization data unit as a part of a beacon transmission.

A method according to a first aspect of the invention is characterized by the steps performed by a node device according to a first aspect of the invention.

A method according to a second aspect of the invention is characterized by the steps performed by a node device according to a second aspect of the invention.

A computer program product according to a first aspect of the invention is characterized in that it comprises executable instructions to make a computer perform the method according to the first aspect of the invention.

A computer program product according to a second aspect of the invention is characterized in that it comprises executable instructions to make a computer perform the method according to the second aspect of the invention.

Although the topology of a WSN does not place any requirements about any nodes being stationary, a significant probability still exists that the new node, with which a moving node will want to communicate after losing a link with a previous neighboring node, already was somewhere in a relatively concise neighborhood around the moving node's previous location. In its previous location, the moving node received beacon transmissions from immediately neighboring nodes and thus knew about them. The "neighbor awareness" of the moving node can be significantly extended outwards by making said immediately neighboring nodes announce, preferably in the same beacon transmissions that the nearby nodes will receive anyway, important information about those nodes that a particular moving node does not hear yet but that are only one step away in the network topology.

If a common network beacon frequency exists for making all network beacon transmissions, the most important thing to be announced about potential next-step neighboring nodes is the relative timing of their beacon transmissions in relation to those of the node that is making the announcement. Thus a moving node will immediately know, at which time it should expect a beacon transmission from the next-step neighboring node. If beacon transmissions come on different channels, also channel identification is among the signaled information that a node advantageously receives in beacon transmissions. This way the moving node may manage to avoid having to make full network scans for long periods. Significantly reducing the average occurrence of network scans will mean dramatic savings in the average power consumption of a WSN where nodes are allowed to move frequently.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BEACON TRANSMISSIONS

Maintaining information about neighbor nodes according to an embodiment of the invention is closely related to making beacon transmissions. In the following we will first consider some alternative ways of organizing beacon transmissions in a WSN. The concept of a beacon transmission is well established in the field of wireless sensor networks. It means an informative broadcast-type transmission that at least some nodes will emit repetitively according to a predefined timetable in the purpose of making other nodes around them aware of their existence, and also in order to give said other nodes synchronization information that they can use in setting up an active data transmission connection with the node that made the beacon transmission. In general we may say that beacon transmissions convey information related to controlling of network connections and data transfer between nodes. Some sources use the designation "synchronization packet" to describe essentially the same thing that is here called a beacon transmission.

Figure 1:
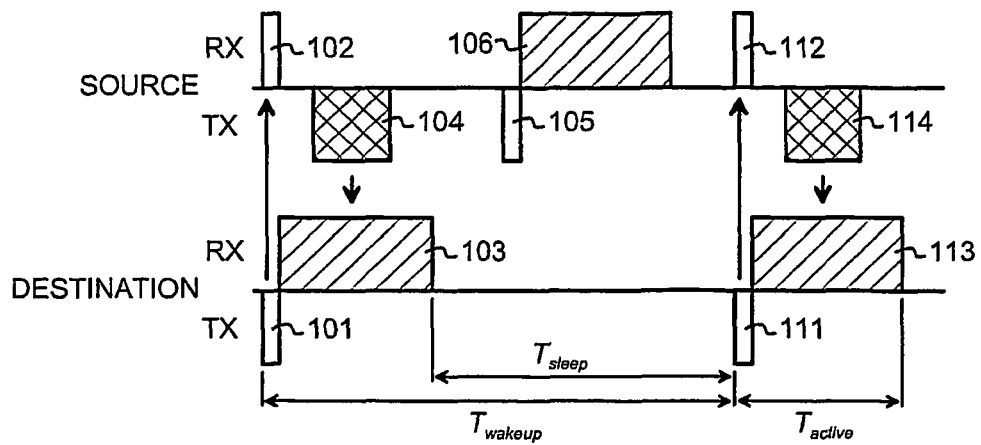
FIG. 1 illustrates transmission and reception in a couple of nodes of a prior art WSN.

The approach of the IEEE 802.15.4 LR-WPAN standard to beacon transmissions was explained earlier in association with FIG. 1. As an illustrative alternative we will consider a division into network beacon signals and cluster beacon signals, as well as the division into active beacon signals and idle beacon signals that is known from publication WO2006/067271.

Figure 2A:
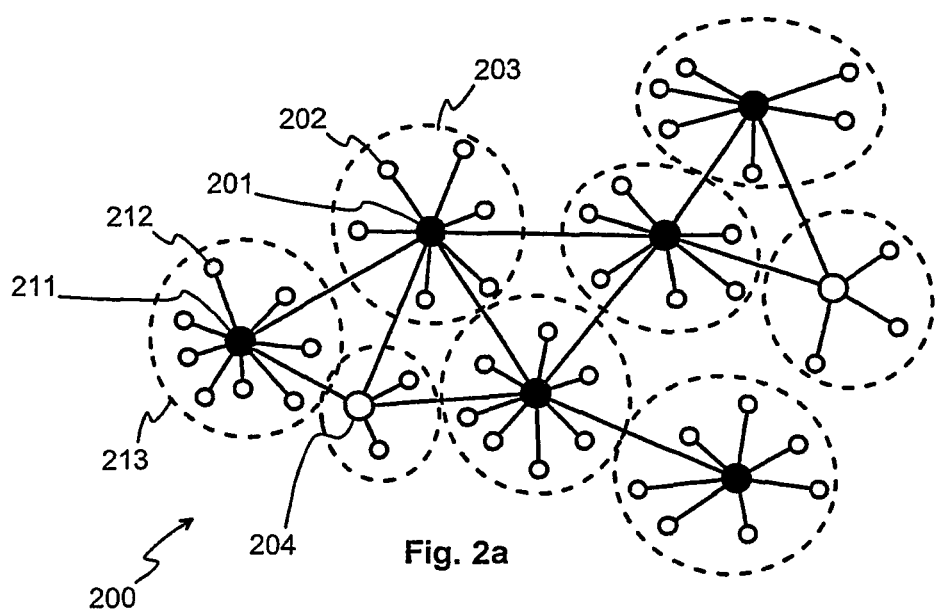
FIG. 2a illustrates a topology of an exemplary WSN.

FIG. 2a is an exemplary graphical illustration of the topology of a wireless sensor network 200. The communications protocol of this network divides the nodes to headnodes and subnodes; for the purposes of the present invention such a division is not essential, but helps to clarify certain concepts. There are a number of nodes that act as headnodes, shown as black circles, like headnodes 201 and 211. Each headnode has one or more subnodes 202 or 212, shown as small white circles, that communicate directly with the headnode. Together a headnode and the subnodes that communicate directly with said headnode constitute a cluster 203 or 213. Communications between clusters take place through peer to peer connections between the headnodes. Multi-hopping is supported and enables basically communications between an arbitrarily selected pair of nodes in the network.

Some of the nodes may act as sink nodes, meaning that they are users of information (while the other nodes are primarily producers of information) and may provide gateway connections to other systems and/or other networks. Sink nodes are shown as large white circles, like sink node 204. A sink node might be e.g. an actuator or a data concentrator. A sink node is not precluded from producing information; in other words the division into information producer nodes and information user nodes does not need to be definitive.

Unlike the cells of cellular radio systems, a cluster is not meant to have a definite coverage area; neither is there any particular objective to provide extensive or continuous geographical coverage. Communications capability is only needed on areas where there are nodes, and on the other hand the nodes are adapted to bring along the required communications capability by themselves without outside configuration. The number of subnodes in any cluster may vary dynamically, new clusters may be set up, old clusters may be dissolved or divided, and the "backbone net" of connections between headnodes may change its topology depending on which of the node devices choose to act as headnodes. A wireless sensor network is typically self-configuring and dynamically adaptive to changes such as appearance and disappearance of head- and subnodes, changes in the physical locations of the nodes, changes in signal propagation conditions between the nodes and so on.

From certain sources there is known a division to so-called Reduced Functionality Devices (RFDs), which are only capable of acting as subnodes, as well as Full Functionality Devices (FFDs), which may act either as subnodes or as headnodes. The designations "RFD" and "FFD" are specific to the IEEE 802.15.4 LR-WPAN standard. What an FFD must have as capabilities additional to those of RFDs include mainly routing and data aggregation. For the purposes of the present invention it is immaterial, whether there is such categorization of nodes or not.

Figure 2B:
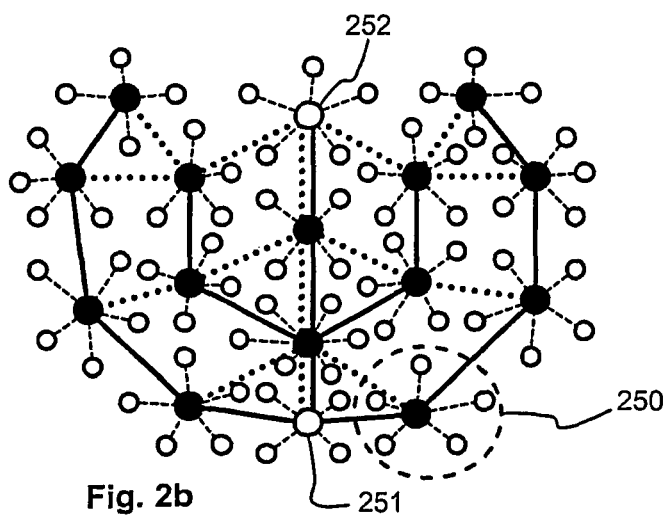
FIG. 2b illustrates a multi-cluster-tree topology

FIG. 2b illustrates a so-called multi-cluster-tree topology. Clusters 250 consist of subnodes (small white circles) that communicate with a headnode (black circle). Several (here: two) cluster-tree structures are superpositioned. In each of them, the headnodes maintain synchronization with other headnodes, but they have selected those other headnodes in slightly different ways in the two different structures. A first cluster-tree structure is illustrated with heavy solid lines between headnodes and it leads to a first sink 251. A second cluster-tree structure is illustrated with heavy dotted lines between headnodes and it leads to a second sink 252. The different cluster-tree structure could also have a common sink.

The multi-cluster-tree topology, where several cluster-tree structures are super-positioned, allows very high network robustness and efficient multi-path routing. Each headnode associates with several parents, which may have paths for different sinks and different routing performance metrics. Hence, the multi-cluster-tree topology can combine the advances of a well-organized and energy-efficient cluster-tree topology with the flexibility of a mesh topology.

Figure 3:
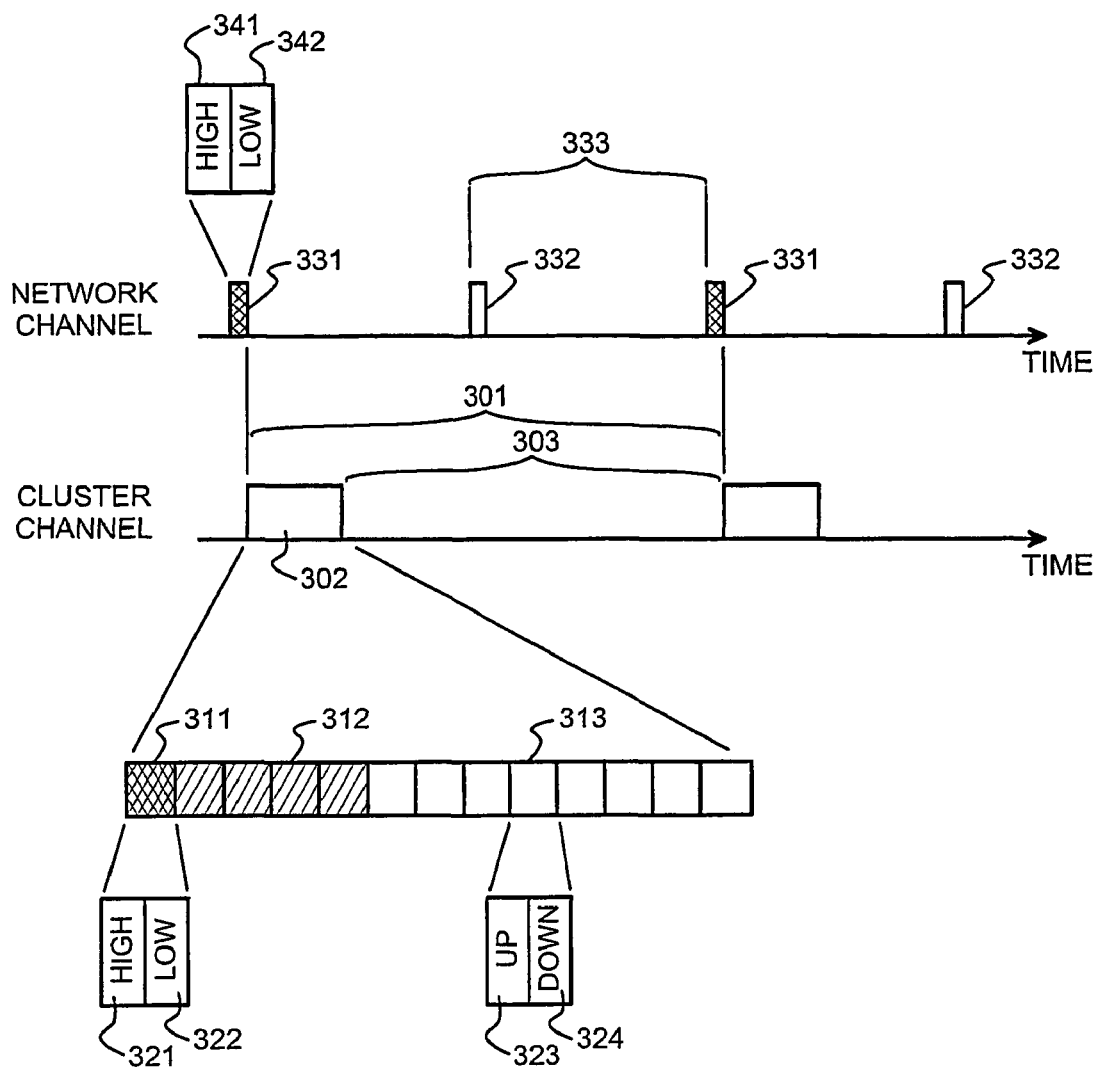
FIG. 3 illustrates an exemplary beacon transmission timetable.

FIG. 3 illustrates timing considerations for transmissions within a cluster. According to FIG. 3, the access cycle 301 consists of a superframe 302 and an idle period 303. The relative length in time of the superframe 302 has been exaggerated for reasons of graphical clarity in FIG. 3; although the length of the access cycle 301 is a system parameter and may vary depending on desired throughput and delay values, the superframe 302 typically occupies a smaller relative portion of the superframe than in FIG. 3. As an example, the length of the access cycle 301 may be something between 1 and 10 seconds, while a suggested length for the superframe 302 is 260 ms.

The superframe 302 comprises a number of slots. In many practical implementations, in the first slot 311 of the superframe the headnode of the cluster transmits a cluster beacon signal. The remaining slots are used for data transmission; for example some slots 312 on the basis of simple contention and other slots 313 as reservable slots. Again, such a division of slots only appears here as a non-limiting example.

Basically it would be possible to decide that the cluster beacon signal is transmitted at some other location within the superframe than at its very beginning. However, beginning the superframe with the cluster beacon signal has certain advantages. It is easy for the other nodes to synchronize themselves to the slot structure of the superframe when it begins with the cluster beacon signal. Additionally since the cluster beacon signal preferably contains the most recent information about the slot allocations concerning the reservable slots, it is good for the other nodes to receive this information before the occurrence of the slots used for exchanging data.

In some practical implementations each slot consists of a first half and a second half. Concerning the cluster beacon slot 311, the first half 321 may be used to transmit a cluster beacon frame at a first power level (here a high power level) and the second half 322 to transmit an essentially identical copy of the same cluster beacon frame at a second power level (here a low power level). The use of different power levels is related to determining the distance between nodes and the required transmission power for other transmissions. Using two different power levels and checking, whether only the higher power level or both can be correctly received, enables the utilization of very simple receiver electronics and most probably the lowest cost implementation, because a signal strength metering circuitry, e.g. Received Signal Strength Indicator (RSSI), is not required. If more resolution in link quality measurements is required, an easy alternative is to increase the number of different power levels at which beacons are transmitted, and to examine, what is the minimum power level at which a beacon comes through strong enough to be correctly received. The halves of the data transmission slots are allocated for uplink and downlink transmission. In this exemplary case the first half 323 of a reservable slot 313 is the uplink half, and the second half 324 is the downlink half respectively.

Making the uplink and downlink halves (or more generally: uplink and downlink transmission instants) follow each other very quickly and in this order facilitates selecting the transmission power for the downlink transmission on the basis of a transmission power used for the uplink transmission. A node making an uplink transmission will select its uplink transmitting power on the basis of how well it can receive beacon signals from the node to which it is transmitting. The selected uplink power is most advantageously announced in a header field included in the uplink transmission. The node that receives the uplink transmission reads the value of said header field and selects the corresponding downlink transmitting power. The closeness in time of the uplink-downlink transmission pair ensures that signal propagation conditions have probably remained essentially the same.

Using downlink slots is not always necessary; at least if the primary task of a network is to convey data quite unidirectionally from subnodes to the direction of sinks. However, maintaining routing information necessitates in most cases that downlink transmission is at least possible, although downlink capacity does not need to be symmetrically equal to uplink capacity. Efficient channel utilization is not a primary concern in WSNs, since data rates are very low.

In addition to transmitting cluster beacon signals and emitting downlink transmissions within the appropriate slots of the superframe 302, a headnode transmits network beacon signals on a network channel. In order to only require the headnode to have a single radio transmitter, it is advantageous to schedule the transmission of the network beacon signals to take place during the idle period 303. In the exemplary embodiment of FIG. 3 a headnode transmits a so-called active network beacon signal 331 once during each access cycle 301. Here the transmission of the active network beacon signal 331 is scheduled to take place at the very end of each access cycle, so that the active network beacon signal 331 will be immediately succeeded by the transmission of the cluster beacon signal at the beginning of a superframe. Additionally the headnode transmits a number of so-called idle network beacon signals 332 during the rest of the idle period 303. Here the number of idle network beacon signals per access cycle is one, but it could be zero or more than one. The beacon period 333 is the length of time between the beginning of a network beacon signal and the beginning of the next network beacon signal. If the headnode transmits network beacon signals at exactly constant intervals, the beacon period 333 is a well-defined constant, and its inverse can be called the beacon rate. If network beacons are transmitted at varying intervals, a mean beacon period and a corresponding mean beacon rate can be calculated.

Distributing Neighbor Data

Figure 4:
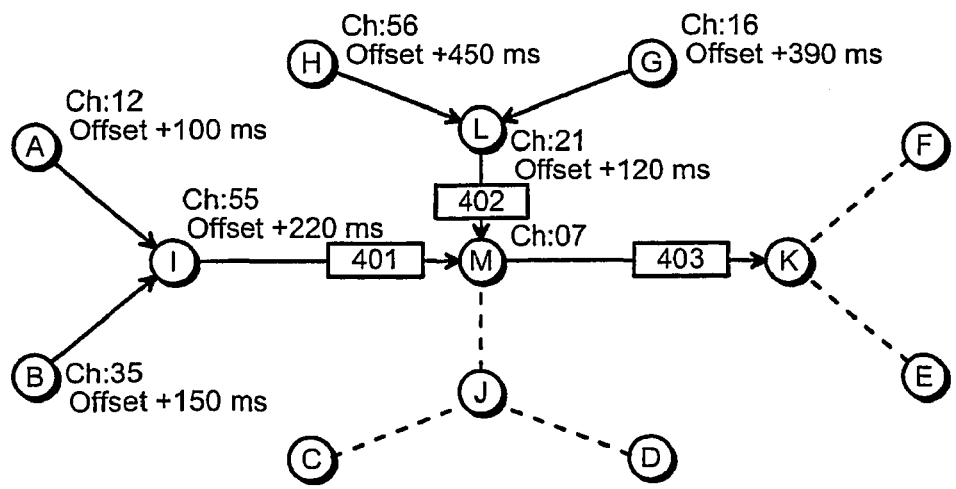
FIG. 4 illustrates the application of a neighbor discovery protocol in a WSN.

The present invention is not sensitive to the selection, whether nodes are divided into headnodes and subnodes, or to any other node classes. However, in this description we will use the designation "parent node" to mean a nearby node from which a node is receiving beacon transmissions. FIG. 4 illustrates number of nodes in a WSN according to an embodiment of the invention. Node M can receive beacon transmissions from nodes I and L; thus nodes I and L are parent nodes to node M. Similarly node M is a parent node to node K, because K can receive beacon transmissions from node M. We assume that even if it would be physically possible for node M to receive beacon transmissions from node J, system specifications say that a node should only maintain synchronization with a maximum of two parent nodes. This number of how many nodes should be kept on a "preference list" is an important network parameter and will be discussed in more detail later. Another possibility is that node J is a subnode of node M (if the concept of a subnode exists in this network) and does not make any beacon transmissions of its own.

According to an embodiment of the invention, a beacon transmission will also contain information about neighboring nodes. Thus, the beacon transmission 401 that node M receives from node I may convey the following information content to node M:

"Node I, channel 55, neighbors(channel 12, +100 ms; channel 35, +150 ms)".

Similarly, the beacon transmission 402 that node M receives from node L may convey the following information content to node M:

"Node L, channel 21, neighbors(channel 56, +450 ms; channel 16, +390 ms)".

We should note that since the beacon transmission is of the broadcast type, and not directed particularly to any specific node, the beacon transmissions made by nodes I and L will also contain information about node M (since we assume in the following that also node M will make beacon transmissions). However, since a node hardly needs any external information to know what it itself is doing, we only speak about the actual information that a node truly acquires by receiving the beacon transmissions.

The offset values indicate, how much time will pass from the beacon transmission that announces the offset value to the occurrence of the other node's beacon transmission meant by the offset value. In other words, for example node B will make its beacon transmission 150 ms later than node I.

In this example we also note that not all nodes making beacon transmissions will do it on some common network beacon channel. If that was the case, it would not be necessary to announce the different channel indicators of the neighboring nodes in the beacon transmissions, but only announcing the offset values would be enough.

Due to the reception of the beacon transmissions 401 and 402, node M has accumulated knowledge about nodes A, B, H, and G. Next we will consider the beacon transmission that node K will receive from node M. It would naturally be possible to make node M tell node K all it knows, i.e. even the information concerning nodes A, B, H, and G. However, assuming that node K will move so that eventually its communication link with node M will deteriorate, in the topology of FIG. 4 it is unlikely that it would move to a location where it could hear best one of nodes A, B, H, or G, without first passing through somewhere where the best possible communications partner would be either node I or node L. Thus intuitively it is sufficient to make node M tell node K about nodes I and L. Also, since the number of nodes from which information accumulates will otherwise rise to a power by each step towards further nodes, it would very quickly become physically infeasible to describe but for the nearest few nodes in a beacon transmission. Thus the beacon transmission 403 that node K receives from node M most advantageously conveys the following information content to node K:

"Node M, channel 07, neighbors (channel 55, +220 ms; channel 21, +120 ms)".

We will introduce the concept of a "synchronization data unit", known by the acronym SDU. An SDU is a piece of digital information that tells to a node, how it must act in order to receive a beacon transmission in a direct and well-aimed manner from a node from which it is not yet actively receiving beacon transmissions. Requiring the reception to be direct and well-aimed means that the SDU must give precise instructions that directly lead to finding the new beacon transmission; a mere instruction to perform a network scan is not an SDU. In WSNs where the beacon transmissions are characterized by a channel (for example: frequency) and transmission time, an SDU will include channel information and time information. The time information may (but does not need to) separately define a beacon interval and the time difference between the access cycles of the advertised node and the node that sent the SDU. The time difference is used to avoid the need for global time and to reduce the required value range, thus fitting the time value into fewer bits. Based on channel and timing information node can detect duplicates and SDUs that refer to a neighbor that is already synchronized to.

The beacon interval information can be used to exactly define in the SDU the transmission time of the next beacon from the advertised node. The beacon interval may change in the network, for example because of different needs for transferring data in different parts of the network. Another possible reason for change is the (temporary) need for adjusting the mutual timing of superframes, so that the routing of data will take place effectively, routing delays are minimized, and overlap of superframe periods are avoided.

In explaining the exemplary beacon transmissions above we implicitly assumed that they refer to cluster beacon transmissions that the neighboring nodes will make in a WSN that includes clusters. Since each cluster has a cluster channel of its own, said beacon transmissions needed to announce the (cluster) channel of the neighboring nodes in addition to the relative time delays. Basically it would be possible to instead refer to network beacon transmissions that the neighboring nodes will make. Since the network beacon channel is the same for all nodes in such a WSN, it would then suffice to only announce the time delays. In practical implementations it is often more energy efficient to refer to cluster beacons, because they usually include important information related to data transmission, which information does not appear in network beacon transmissions in order to keep the network beacon transmissions as short as possible to save energy.

The neighbor discovery protocol, i.e. the practice of sending synchronization-related information about neighbor nodes in beacon transmissions, naturally requires the beacon frames to be formatted so that they can accommodate the necessary data bits. The neighbor discovery protocol could be implemented as an add-on to many existing WSN arrangements; for example the IEEE 802.15.4 LR-WPAN standard allows the beacon frame to have a payload part, which the node making beacon transmissions may use to send the neighbor node information. The invention can also be implemented as an add-on to the existing S-MAC and SMACS protocols.

It should be noted that the invention does not exclude generating and transmitting SDUs even concerning child nodes. In many WSN implementations nodes that have the status of a subnode do not make beacon transmissions; however, they may have other characteristics that could be useful in describing them to other nodes that may be moving towards such a subnode. In this sense the concept of an SDU could be widened so that an SDU comprises any such information about a node that could be useful in a later attempt to establish a link with such a node.

In practice, the neighbor discovery protocol that causes synchronization to be maintained with more than one neighboring node leads to the generation of a multi-cluster-tree topology, which has been described above in association with FIG. 2*b*.

Procedure at Link Failure or Weakening

Figure 5:
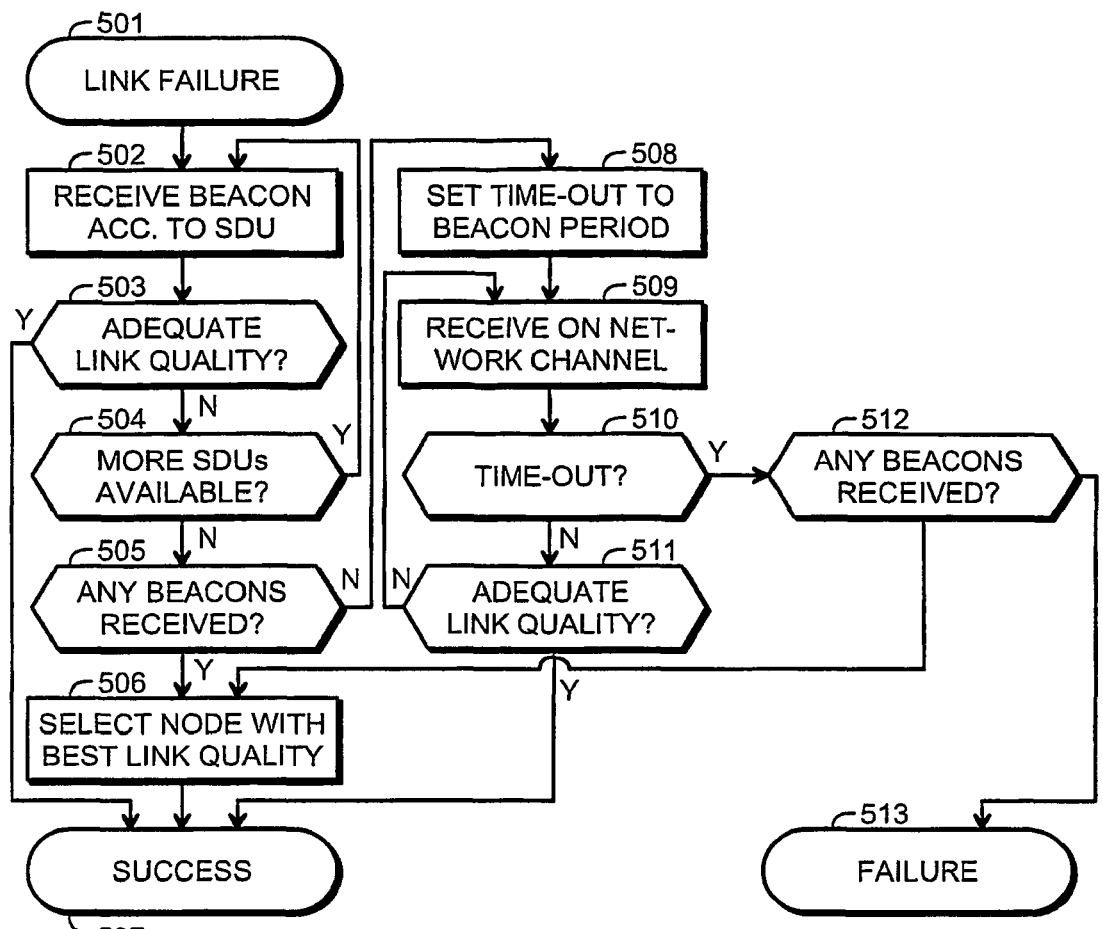
FIG. 5 illustrates a method for reacting to link failure.

We assume that according to system specifications, a node will actively receive beacon transmissions from a maximum of k other nodes (i.e. a node will have a maximum of k parents), where k is a positive integer, at least 1 and typically in the range from 2 to 4 these limits included. Together with the assumption that a beacon transmission will contain SDUs that describe only the immediately neighboring nodes, this means that a node will accumulate and maintain a database of a maximum of $k^2$ SDUs. FIG. 5 illustrates a method for a node to utilize these stored SDUs in a case where a communications link with a previous parent node is found to fail (step 501).

The fact that a previously used link failed suggests that the node has previously received at least some SDUs. At step 502 it activates its receiver on the channel and at the moment indicated by a stored SDU. Step 503 is a check for the link quality. If receiving the beacon succeeded with at least adequate link quality, the method immediately ends in success according to step 507. If the link quality was insufficient, the node checks at step 504, whether it has more SDUs in store. The node circulates the loop consisting of steps 502, 503, and 504 as long as there are stored SDUs that have not bee tried yet.

A negative outcome at step 504 means that the node did not find a new parent by using the stored SDUs. However, it may be that it received some beacons that only slightly missed the link quality target. It is always possible that one of these will achieve better quality in the future. Additionally performing a network scan is so energy-intensive that it should be avoided if only there are better alternatives. Thus a positive finding at step 505 leads to selecting the best there is, i.e. the received beacon with best available link quality, in step 506 and ending in success in step 507.

If there were no received beacons at all, a network scan is needed. The node sets a time-out equal to the beacon period at step 508 and starts receiving at step 509. Reception will stop either at time-out (step 510) or when a beacon is received with adequate link quality (step 511). If there is a common network channel for beacon transmissions, reception at step 509 takes place on the network channel. In systems where beacon transmissions may come on various channels, the node must go through steps 508 to 511 for all such channels until it finds a beacon. Again, even if before time-out there were no beacons with adequate link quality, it is advisable to select the best available by going from step 512 to step 506. Only if no beacons were received at all the method will end in failure at step 513.

A slightly different approach to node operation is presented in the following in the form of pseudocode. This neighbor discovery algorithm is based on three main principles: maintaining redundant communication links, anticipating movement based on the link quality changes, and using the distributed neighbor information for energy-efficient neighbor discovery. Also in other embodiments of the invention it is not necessary to wait until a concrete link failure; an observed weakening in link quality can trigger a process of looking for and establishing a new link to replace the weakening one. Such a proactive approach helps to minimize delays in data transfer.

For assuring continuous data routing in a dynamic network, adequate redundancy of communication links is highly advantageous. We assume that communication links are maintained with k neighbors. The value of k depends on the frequency of link changes and thus, the degree of network dynamics. When a communication link fails, other links assure, continuous data routing. Also, the use of several parallel communication links is ideal for multi-cluster-tree network topology, as that described in publication WO2006/067271.

Observing link quality changes and replacing low quality links prevents unexpected link breaks and allows continuous routing. Because dynamic networks do not allow long term observation of link quality, Received Signal Strength Indication (RSSI) is used in the following for fast link quality evaluation. Other kinds of known methods could also be used.

The pseudocode algorithm consists of two functions, NEIGHBOR_DISCOVERY that maintains connectivity to the neighbors, and SYNCHRONIZE that is a utility function performing beacon reception according to the SDUs. The following symbols are used:

| | |
|---|---|
| rssi(n) | link quality to the node n |
| N* | the list of synchronized neighbor nodes |
| $N_+$ | the list of nodes n with increased rssi(n), $N_+ \subseteq N^*$ |
| $N_-$ | the list of nodes n with decreased rssi(n), $N_- \subseteq N^*$ |
| S: | the list of received SDUs |
| source(s) | a set of nodes that has sent SDU s, s ∈ S |
| k | the number of nodes that synchronization is maintained to |
| $q_0$ | a limit for minimum link quality required for reception |
| $q_+$ | a limit for preferred link quality |
| $t_s$ | network scan timer. |

```
     NEIGHBOR_DISCOVERY( )
1    while N* = Ø
2       if timer t_s has expired
3          perform network scan
4          N* ← k nodes found in scan
5          reset timer t_s
6       if |N*| < k
7          N ← SYNCHRONIZE(N*, q_0, q_+, k − |N*|)
8          if N ≠ Ø
9             N* ← N* ∪ { select k − |N*| nodes from N }
10      if |N*| = k
11         for each n ∈ N*
12            N ← Ø
13            if n ∈ N_
14               Arrange N_+ in descending order by RSSI
``` change
```
15            N ← SYNCHRONIZE(N_+, q_0, q_0, 1)
16         if N = Ø and n ∉ N_+ and rssi(n) < q_+
17            N ← SYNCHRONIZE(N*, q_+, q_+, 1)
18         if N ≠ Ø
19            N* ← N* − {n}
20            N* ← N* ∪ { select a node from N }
   Listens to the nodes determined by SDUs sent by neighbors in
   N_0. Stops reception after finding c neighbors with link quality
   q_end. Returns a list of beacons with the minimum link quality
   q_min.
     SYNCHRONIZE(N_0, q_min, q_end, c)
21   U = {s | s ∈ S ^ (∃n: n ∈ N_0 ^ n ∈ source(s))}
22   Order s, s ∈ U by source(s) index in N_0
23   N = Ø
24   while U ≠ Ø
25      select SDU s from U that sends next beacon
26      U ← U − {s}
27      wait until beacon tx time; receive beacon
28      if reception successful
29         initialize node n from s and the received beacon
30         if rssi(n) ≥ q_min
31            N ← N ∪ {n}
32         if rssi(n) ≥ q_end
33            c ← c − 1
34            if c = 0
35               return N
36   return N
```

Network scans are only used when a synchronized neighbor is not known (lines 1-5). A node having good link quality has high probability of advertising neighbors that are within communication range, whereas a low quality link is unreliable and might broke. Therefore, for ensuring that a new network scan is not required, the scan is continued until either a neighbor with high RSSI or k neighbors are found. A timer is used to prevent constant scanning, if a neighbor within the communication range does not exist. After the scan, the node synchronizes to the neighbors with highest link quality.

The SDU information is used to get the connectivity up to k neighbors (lines 6-9). The node listens to the beacons determined by the received SDUs, while searching for a neighbor with good link quality ($q_+$). However, if the listening to the SDUs does not provide enough neighbors having good link quality, lower quality ($q_0$) links are also accepted. The latter part of the algorithm monitors neighbor information and attempts to replace these low quality links with better ones (lines 10-20).

The algorithm prefers selecting neighbors with high link quality (lines 9 and 20), as these have low frame error rate and allow energy saving with transmission power control. Furthermore, when having several choices with equal or almost equal link quality, neighbors that advertise different SDUs are selected. The selection allows getting comprehensive neighborhood information, which gives more choices on neighbor selection and thus adds robustness.

The algorithm adapts to movement by preferring neighbors that are coming closer ($N_+$) and avoiding nodes that are moving away ($N_-$). $N_+$ and $N_-$ lists are updated upon beacon reception. Small changes in link quality are filtered out to prevent normal variation in the measured signal quality and slow movement from causing unnecessary link replacements.

If a neighbor is moving away, a replacement is searched from the SDUs advertised by neighbors that are coming closer (lines 13-15). The search finishes after detecting a new neighbor with any link quality ($q_0$). Even low quality link is accepted, since the node is moving towards the advertiser. Thus, it is probable that the link quality of the accepted neighbors also increases. The SDUs of the fastest moving nodes are handled first (lines 14, 21-22), because the movement is towards the neighborhood of the node in question. Lines 16-17 handle the situation when the node is stationary, moving slowly, or the link quality of the neighbor is bad and a replacement was not found from $N_+$ list. Again, the nodes that are moving closer are allowed to have low link quality.

It should be noted that since the timings are known exactly, a node does not continuously listen to the radio. Thus, the neighbor detection with distributed information has an additional benefit over traditional network scan, as a node can sleep or communicate with its neighbors while waiting for a beacon reception in the synchronization part of the algorithm.

Selection of SDUS and Links

A node may have an oversupply of neighboring nodes with which it could maintain communication links. In order to most effectively prepare for possible changes in links, it would be advantageous if the node could select those nodes from which it receives SDUs so that they are located in as many different directions as possible. This is easily accomplished so that the node tries to synchronize primarily to those other nodes from which it can receive as much different SDUs as possible. In other words, the node tries to avoid receiving duplicate SDUs. Maximizing the number of received and stored unique SDUs also maximizes the possibility of finding a useful new link on the basis of the stored SDUs. This is most important in sparse networks that only have a small number of other nodes within the radio range.

Above in the pseudocode-based embodiment we already touched upon the subject of monitoring the changes in link quality. If the quality of a link seems to be improving, the node may well decide to keep it even if the link quality was low to begin with, because the observed improvement suggests that these nodes are in a relative movement towards each other, so that the link may be much better in the future. On the other hand a weakening link is most likely to become obsolete and is a good candidate for being replaced even if it currently would still have an acceptable link quality.

Example of a Node

Figure 6:
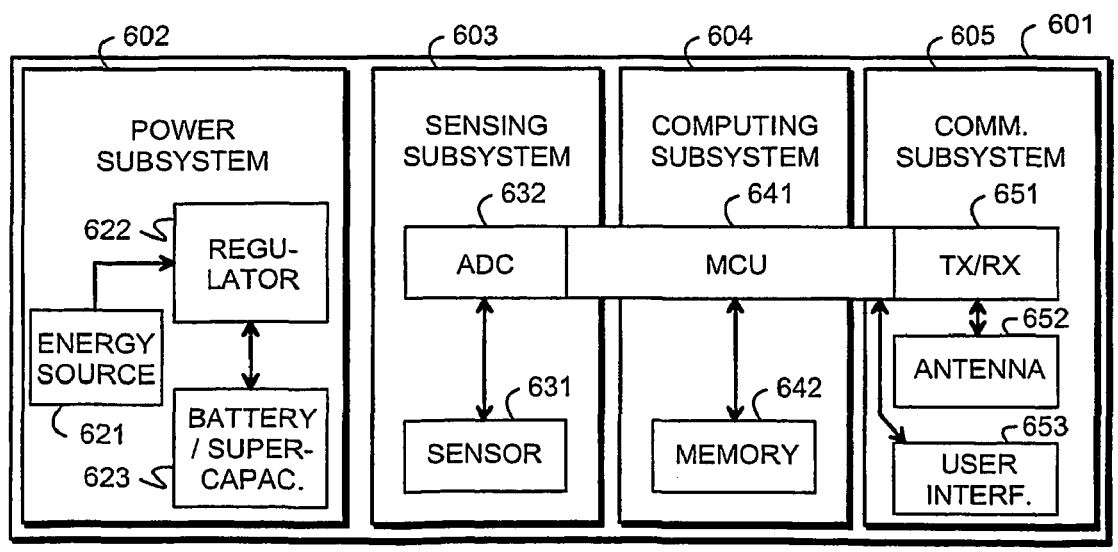
FIG. 6 illustrates some functional blocks of an exemplary node.

FIG. 6 illustrates the architecture of an exemplary node device 601 according to an embodiment of the invention. A computing subsystem 604 is adapted to execute the MAC (Medium Access Control) protocol, the upper protocols and application algorithms depending on available performance and memory. An exemplary physical implementation of the computing subsystem comprises a Microchip PIC18LF4620 MicroController Unit (MCU) 641, which integrates an 8-bit processor core with 64 kB FLASH program memory, 4 kB RAM (random-access memory) data memory, and 1 kB EEPROM (electrically erasable programmable read-only memory). An external memory 642, for example an 8 kB EEPROM, may be used to provide a non-volatile data storage. The controller has high energy efficiency and versatile power saving modes allowing accurate and low energy wake-up timing with external 32.768 kHz clock crystal (not shown). Active mode operation is clocked by an internal adjustable clock source. An exemplary utilized clock frequency is 4 MHz resulting in 1 MIPS performance. An internal 10-bit Analog-to-Digital Converter (ADC) 632 is used for monitoring battery energy status. Also an external sensor 631 with analog output can be connected to the ADC.

A communications subsystem 605 comprises an RF transceiver 651, an antenna 652 and the part of MCU 641 that executes the communication protocols. An exemplary physical implementation of the communications subsystem 605 utilizes a Nordic Semiconductor nRF2401 2.4 GHz transceiver having selectable 250 kbps or 1 Mbps transmission data rate and 83 available frequency channels. Transmission power level is selectable between −20 dBm and 0 dBm. The radio has an interface for low speed MCU, which consists of 32 B data buffers (not shown) for transmission and reception, and address recognition and CRC error detection logic. These simplify data processing in MCU and allow low speed data exchange between MCU and radio. A loop type antenna 652 can be implemented for example by a PCB trace having a dipole type radiation pattern. A simple user interface 653 is implemented by a push button and a LED.

A sensing subsystem 603 most advantageously takes use of the internal ADC 632 and of the MCU 641. The MCU 641 may be used for implementing an ADC driver and sample transmission tasks for the application layer. As a sensor 631 nearly any type of sensor may be used depending on the application. Besides sensors with analog output and connected to ADC, also sensors with digital output can be used by connecting them directly on MCU digital input/output pins; for example a Dallas Semiconductor DS620 sensor interfaced with a digital I2C bus.

The power subsystem 602 may be designed in various ways. The exemplary design of FIG. 6 comprises an energy source 621, which may be for example an ambient energy scavenging circuit based on piezoelectric phenomena, a photovoltaic cell, or for example a 1600 mAh CR123A Lithium battery. A regulator 622 is used to regulate the supply power provided to the rest of the node device. Although a switch mode regulator would have higher efficiency, a linear regulator such as a MAX1725 linear voltage regulator may still be preferable due to its lower quiescent current, lower noise, lower electromagnetic interferences and smaller size. As a temporary storage of energy and a peak demand reservoir there may be used a rechargeable battery or a supercapacitor 623.

The dimensions of said prototype are 124 mm in length and 21 mm in diameter. The prototype consists of two separate boards: one for MCU, radio, voltage regulation and temperature sensor, and other extension board for battery, push button, LED and I/O connector.

Prototype power consumption measurements are presented in the following table.

TABLE 1 power consumption figures of a prototype node

| Symbol | MCU | Transceiver | Power (mW) |
|---|---|---|---|
| $P_{rx}$ | 1 MIPS | RX | 60.17 |
|  | 1 MIPS | TX (0 dBm) | 42.17 |
| $P_{tx}$ | 1 MIPS | TX (−6 dBm) | 34.67 |
|  | 1 MIPS | TX (−12 dBm) | 31.37 |
|  | 1 MIPS | TX (−20 dBm) | 29.57 |
|  | 1 MIPS | Stand-by | 3.29 |
|  | 1 MIPS | Sleep | 3.17 |
|  | Sleep | Sleep | 0.037 |

Figure 7:
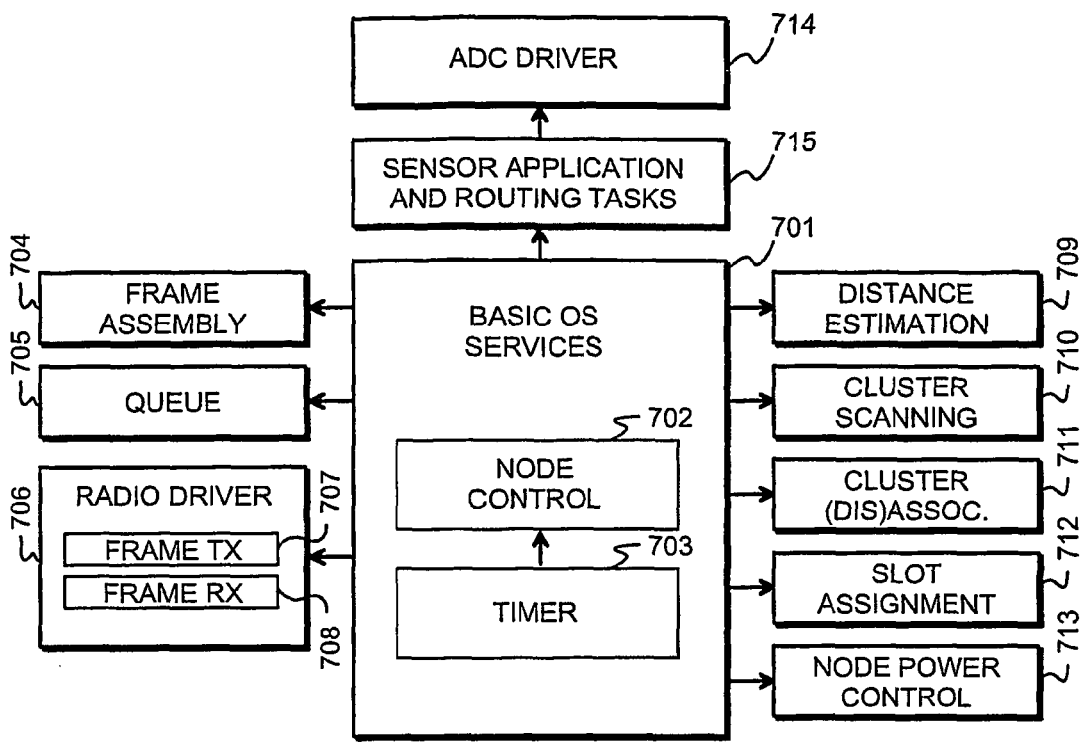
FIG. 7 illustrates the composition of an exemplary node control program.

FIG. 7 illustrates an exemplary software architecture for a node like that illustrated above in FIG. 6. The basic operating system services 701 comprise, among others, a general node control state machine 702, the operation of which is scheduled by a timer 703. The node control state machine 702 performs MAC function calls depicted as arrows. The frame assembly 704, queue 705 and radio driver 706 (including frame TX 707 and frame RX functions 708) are associated to data and control flow. Management functions on the right side of FIG. 7 are executed on demand and include distance estimation 709, cluster scanning 710, cluster association and disassociation 711, slot assignment 712 and node power control 713. The ADC driver 714 controls sensor sampling and constitutes a specific part of sensor application and routing tasks 715, which in the protocol stack belong to the applications layer. Software can be developed using any available development tool, such as Microchip MPLAB C30 (v2.00).

Energy and Performance Analysis

For determining the energy consumptions of a frame transmission and reception, and a network scan, we model them by radio energy models corresponding to the behavior of the exemplary node described above. While the frame formats for network procedures may vary, in the following we consider an exemplary radio frame that has a fixed length of 256 bits. This is the maximum data buffer size of the radio in the exemplary node implementations. The models focus on radio energy consumption, because MCU energy consumption is in any case very small compared to the radio transceiver's figures. In the following models MCU power consumption is included in the radio power consumptions. The following symbols are used, and the corresponding quantities may have for example the following exemplary values:

TABLE 2 symbol descriptions and exemplary values

| Symbol | Description | Defined value |
|---|---|---|
| $\epsilon$ | crystal tolerance | 20 ppm |
| $f_c$ | cluster beacon transmission rate | 0.5 Hz |
| $f_n$ | network beacon transmission rate | 0.01 Hz-100 Hz |
| k | number of nodes with which synchronization is maintained | 1-4 |
| $L_f$ | frame length | 256 bits |
| r | radio range | 10 m |
| $\rho$ | range of sufficient signal strength compared to maximum radio range | 0.5 |
| R | radio data rate | 1 Mbps |
| $t_i$ | synchronization inaccuracy | 50 µs |
| $t_{st}$ | transmitter and receiver start-up time | 200 µs |

A frame transmission consists of a radio start-up transient time ($t_{st}$) and actual data transmission defined as the ratio of frame length ($L_f$) and radio data rate (R). During a start-up transient, the radio power consumption is approximated to be equal to the transmission mode power consumption ($P_{tx}$). Since the transmission power level may be dynamically adjusted according to a communication link quality, we approximate that averagely −6 dBm transmission power is used. Thus, the frame transmission energy $E_{tx}$ is modeled as $$E_{tx} = \left(t_{st} + \frac{L_f}{R}\right) P_{tx}. \quad (1)$$

The transmission energy consumption is $E_{tx}$=15.8 µJ with the numerical values of table 1 and table 2, which equals 62 nJ per transmitted physical layer bit.

A frame reception begins with the radio start-up transient. The radio consumes the reception mode power ($P_{rx}$) until a frame has been received including idle listening time due to synchronization inaccuracy ($t_i$) and crystal tolerance ($\epsilon$). The frame reception energy $E_{rx}$ is modeled as $$E_{rx} = \left(t_{st} + t_i + \frac{2\epsilon}{f_c} + \frac{L_f}{R}\right) P_{rx}. \quad (2)$$

The reception energy consumption per received packet is $E_{rx}$=35.3 µJ with the numerical values of table 1 and table 2, which equals to 138 nJ per physical layer data bit.

A network scan begins with a radio start-up transient. Then, the radio is in RX mode in average for the duration $t_{ns}$. Thus, the network scan energy $E_{ns}$ can be modeled as $$E_{ns} = (t_{st} + t_{ns}) P_{rx}. \quad (3)$$

The additional energy needed for processing individual beacon receptions during the scan is negligibly small compared to the network scan energy and can therefore be ignored in the model.

Figure 8:
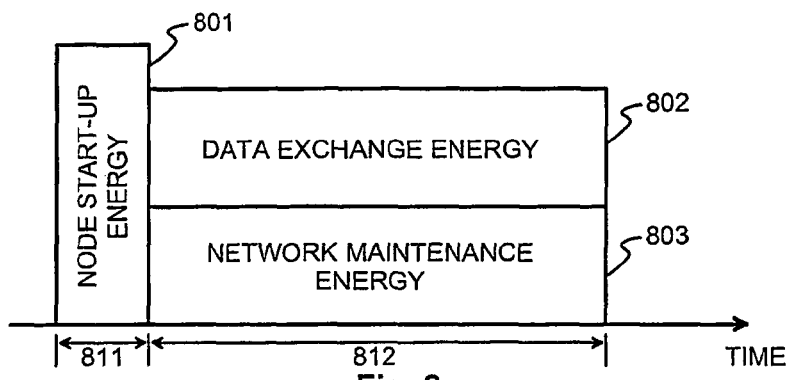
FIG. 8 illustrates the division of energies into certain separately analysed parts.

For making the analysis of the neighbor discovery protocol independent of data exchanges, we divide the energy consumed in a wireless sensor node in three classes: node start-up, network maintenance, and data exchange energies, as illustrated in FIG. 8. The node start-up energy 801 consists of neighbor discovery and network association operations. The network maintenance and data exchange operations are executed after the start-up period during the node lifetime. The network maintenance energy 803 consists of beacon transmissions and receptions (beacon exchange), network scans, and possible re-associations. The data exchange energy 802 is consumed by payload data transmissions and receptions, and the MAC signaling frames related to data transmissions, such as acknowledgement.

As node lifetimes are expected to be from months to years, the start-up energy consumed during the start-up period 811 is negligible small compared to the total node energy consumption during the rest of the node lifetime 812. Furthermore, we assume that data exchange operations are not affected by network maintenance operations. Hence, from now on we focus purely on the network maintenance operations.

Since all nodes typically utilize similar neighbor discovery protocol and network beacon transmissions, we may assume that the network supports random mobility for all nodes. The maximum degree of mobility is limited most significantly by a routing protocol, which is outside the scope of this invention. In the following analysis we model the energy consumption of a single mobile node moving among a stationary sensor field.

We first model the performance of the neighbor discovery protocol, and then energy optimize network beacon transmission rate. Energy consumption is considered over 1 s periods of operation, which equals to average power consumption. The evaluation of average power instead of energy is more convenient due to the time independency.

Assuming a uniform node distribution, let node density be d nodes/m². This means that n=dπr² nodes are located in a radio range (r). Let us consider a node that maintains synchronization and receives SDUs from k neighboring nodes. As a node moves in a stationary WSN field at speed v, a communication link failure occurs when any of the k links fails. The resulting communication link failure rate ($f_f$) is $$f_f = \frac{kv}{r}. \quad (4)$$

Figure 9:
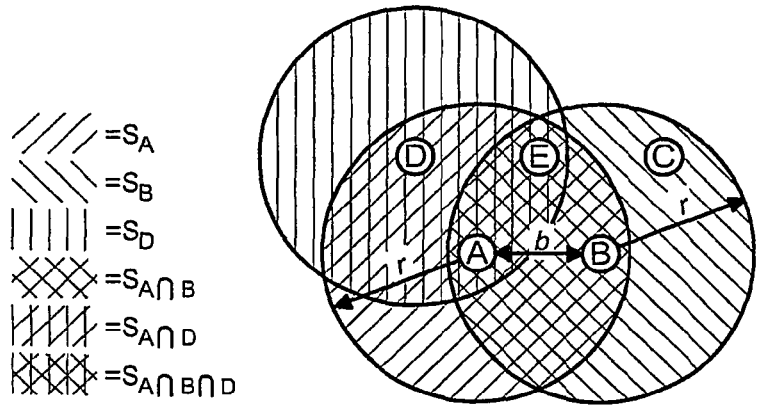
FIG. 9 illustrates certain topological concepts used in the energy analysis.

Next, we model the probability of successful neighbor discovery using received SDUs. Let's consider a situation presented in FIG. 9, where a node A maintains synchronization and receives SDUs from nodes B and D. The distance between nodes A and B is b, and their radio ranges form circles with a radius r. Moreover, node B maintains synchronization and receives SDUs with nodes C and E located in its range. Since node E is in the intersection area of the ranges of nodes A and B ($S_{A \cap B}$), node A can receive its (beacon) transmissions and the SDU signaled by node B to node A is useful. Node C is outside the area $S_{A \cap B}$, so node A cannot detect its transmissions, resulting in a useless SDU. The size of the intersection area $S_{A \cap B}$ is defined by the radius r and the distance b as $$INTC(b) = 4 \int_{b/2}^{r} \sqrt{r^2 - x^2} \, dx. \qquad (5)$$

Thus, the probability $p_i$ that a node located in $S_B$ is also in the intersection area $S_{A \cap B}$ equals to $INTC(b)/\pi r^2$. Moreover, let nodes A and B be randomly located neighbors, so that b gets a value in the range [0, r], and node A receives SDUs from node B. The probability that a received SDU is useful is determined by integrating the probability $INTC(b)/\pi r^2$ over the circle of radius b centered at A for b in [0, r]. We obtain $$p_i = \int_0^r \frac{2\pi b \cdot INTC(b)/(\pi r^2)}{\pi r^2} db \approx 59\%. \qquad (6)$$

As each node maintains synchronization with other k nodes, which all generate k SDUs, the probability q that none of the received $k^2$ SDUs is useful and a network scan is required is modeled by $$q = \prod_{a=1}^{k} \left(1 - \frac{np_i}{n-(a-1)}\right)^k. \qquad (7)$$

The required network scan interval ($I_{ns}$) is $$I_{ns} = \frac{1}{f_f q}. \qquad (8)$$

In case of a link failure, a node attempts to receive beacons according to SDUs until a new neighbor with sufficient signal strength is detected. We define that the range of sufficient signal strength in proportion to maximum radio range (r) is p. The expected number (u) of beacon receptions until one beacon within the distance of pr is successfully received is modeled by weighted average as $$u = \qquad (9)$$

$$\sum_{a=1}^{k^2-1} \left[ a \left( \prod_{b=1}^{a-1} 1 - \frac{np_i \rho^2}{n-(b-1)} \right) \frac{np_i \rho^2}{n-(a-1)} \right] + k^2 \left( \prod_{a=1}^{k^2-1} 1 - \frac{np_i \rho^2}{n-(a-1)} \right).$$

This model is a slight simplification, since multiple SDUs referring to a same node or a current neighbor are not considered. However, such receiving of multiple SDUs is improbable in dense WSNs, where the number of nodes in range is high.

If no new neighbors are detected by SDUs, a network scan is performed. The network scan will last until a node within a range of pr is detected. The number $n_b$ of beacon receptions until one with sufficient signal strength is received is modeled by $$n_b = \qquad (10)$$

$$\sum_{a=1}^{n-1} \left[ a \left( \prod_{b=1}^{a-1} 1 - \frac{n\rho^2}{n-(b-1)} \right) \frac{n\rho^2}{n-(a-1)} \right] + n \left( \prod_{a=1}^{n-1} 1 - \frac{n\rho^2}{n-(a-1)} \right).$$

The required network scan duration $t_{ns}$ for detecting a new node with sufficient signal strength is given by $$t_{ns} = \frac{n_b}{f_n n}. \qquad (11)$$

Figure 10:
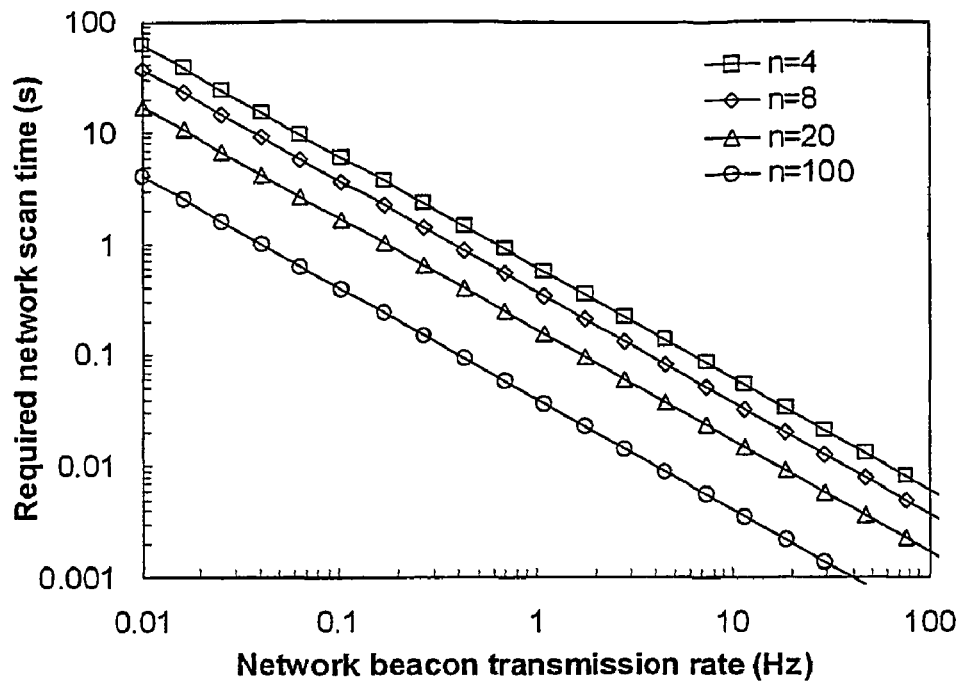
FIG. 10 illustrates calculated required network scan time as a function of network beacon transmission rate.

The required network scan duration $t_{ns}$ as a function of network beacon transmission interval is plotted in FIG. 10 with exemplary numerical values r=10 m and d=0.1 nodes/m². If n is high, $t_{ns}$ is reduced by even one order of magnitude compared to entire network beacon interval.

A network maintenance power consumption $P_m$ is defined as a sum of network scan power $P_{ns}$ and a beacon exchange power $P_b$. The network scan power $P_{ns}$ depends on the energy $E_{ns}$ of a single scan procedure, and the average network scan interval $I_{ns}$. Long-time average network scan power consumption is obtained by $$P_{ns} = f_f q \left( t_{st} + \frac{n_b}{f_n n} \right) P_{rx}. \qquad (12)$$

If the WSN involves separately transmitting network beacons and cluster beacons, beacons are transmitted periodically on a cluster channel at the beginning of each superframe at rate $f_c$, and on a network channel at rate $f_n$. In addition, both network beacons and cluster beacons may be received at the beginning of superframes at rate $f_c$ from the k neighbors with which synchronization is maintained. Network beacons are required for acquiring SDUs, and cluster beacons for performing data exchanges in superframes. Next, we consider the highest energy case, where the both beacon types are always received at the beginning of each superframe. The average power consumed by the beacon exchange is $$P_b = (f_n + f_c) E_{tx} + (2 f_c k + f_f u) E_{rx}. \qquad (13)$$

Figure 11:
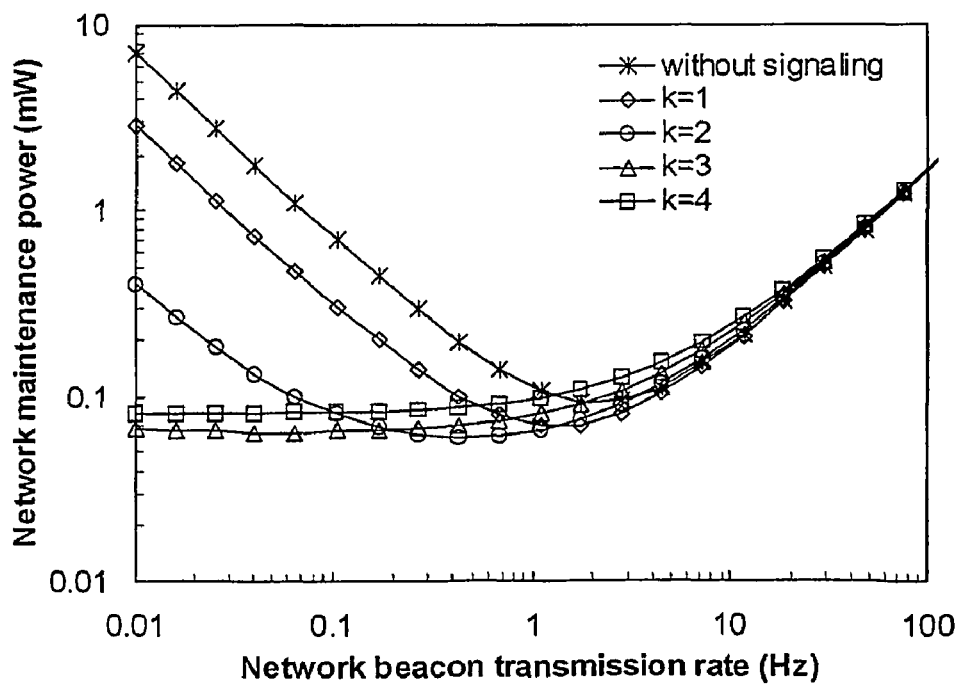
FIG. 11 illustrates calculated network maintenance power for slowly moving nodes.
Figure 12:
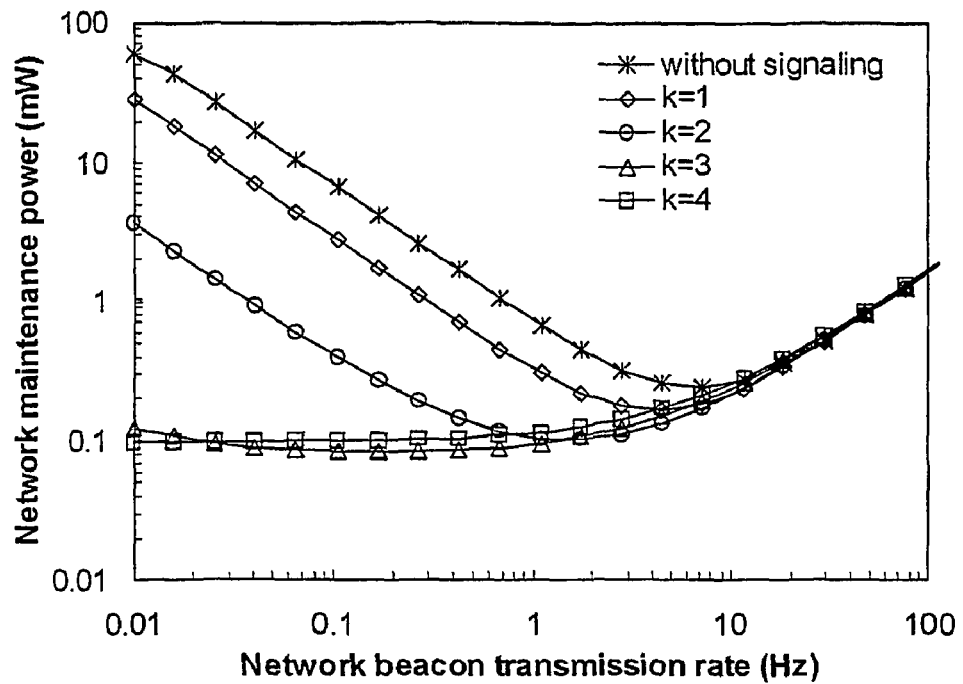
FIG. 12 illustrates calculated network maintenance power for nodes moving at moderate velocity.
Figure 13:
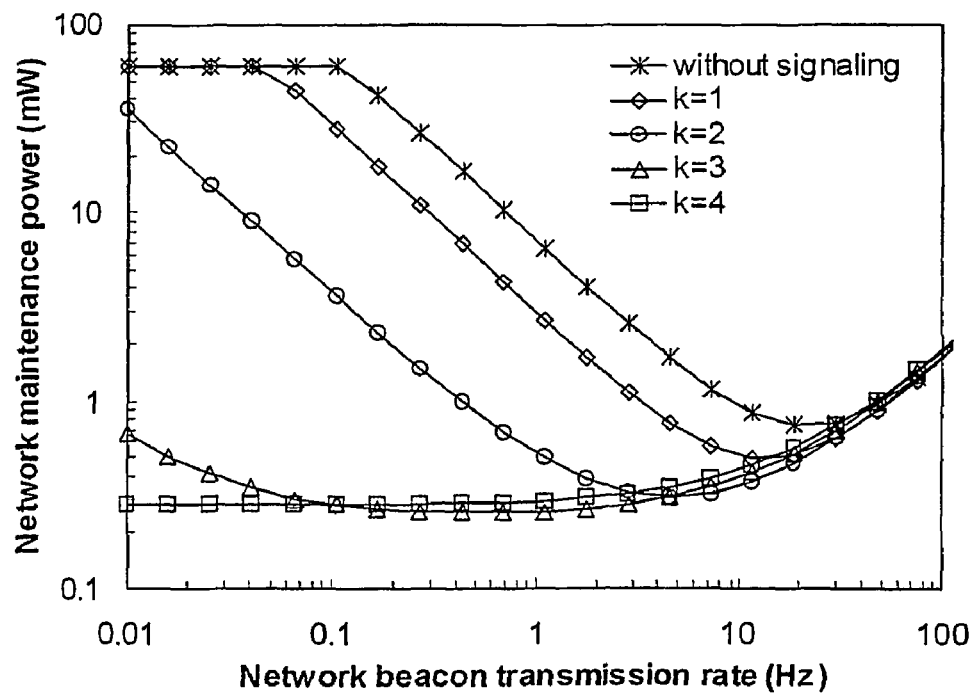
FIG. 13 illustrates calculated network maintenance power for nodes moving at high velocity.

Network maintenance power consumption is plotted as a function of network beacon transmission rate, and with 0.1 m/s, 1 m/s and 10 m/s node mobility in FIGS. 11, 12, and 13 respectively (other assumed numerical values are r=10 m, d=0.1 nodes/m², and ρ=0.5). As seen in the figures, node mobility significantly increases network maintenance power consumption, when neighbor discovery protocol is not used. Power consumption can be reduced to some extent by adjusting the network beacon transmission rate according to mobility, but significantly lowest power consumption is achieved by using the neighbor discovery protocol. Typically the highest energy efficiency is achieved by selecting k=3.

An energy optimal network beacon transmission rate $f_n^*$ is determined by minimizing the network maintenance power with respect to the beacon transmission rate. It can be shown that there exists a unique minimum for $f_n^*$ that is obtained by writing $P_m = P_{ns} + P_b$ (see formulas 11 and 12 above) and setting $\partial P_m / \partial f_n = 0$. This yields $$f_n^* = \sqrt{\frac{P_{rx}}{E_{tx}I_{ns}n}\left(\frac{\sum_{a=1}^{n-1}\left[a\left(\prod_{b=1}^{a-1}1-\frac{n\rho^2}{n-(b-1)}\right)\frac{n\rho^2}{n-(a-1)}\right]+}{n\left(\prod_{a=1}^{n-1}1-\frac{n\rho^2}{n-(a-1)}\right)}\right)} \quad (14)$$

Figure 14:
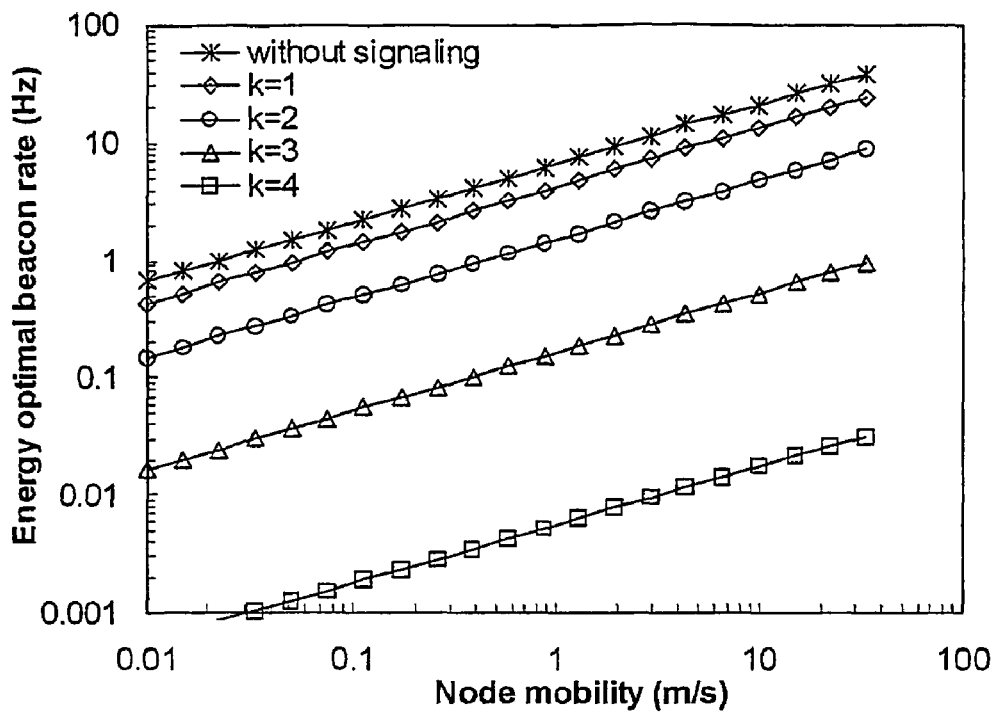
FIG. 14 illustrates the optimal beacon rate as a function of node mobility.

An optimal network beacon transmission rate is determined by the network scan interval ($I_{ns}$), the beacon frame transmission energy ($E_{tx}$), the radio power consumption in reception mode ($P_{rx}$), the number of nodes in range (n) and the range of sufficient signal strength ($\rho$). Furthermore, the network scan interval $I_{ns}$ is a function of node speed (v), radio range (r) and the number of nodes with which synchronization is maintained (k). The energy optimal beacon transmission rate is plotted as a function of node speed in FIG. 14. The optimal beacon transmission rate increases in proportion to the node speed. Without the neighbor discovery protocol, the optimal beacon rate is over 10 Hz already with a 1 m/s node speed. By using the neighbor discovery protocol, optimal beacon transmission rates are even three orders of magnitude less. This indicates that network scans are very infrequent with the neighbor discovery protocol.

Figure 15:
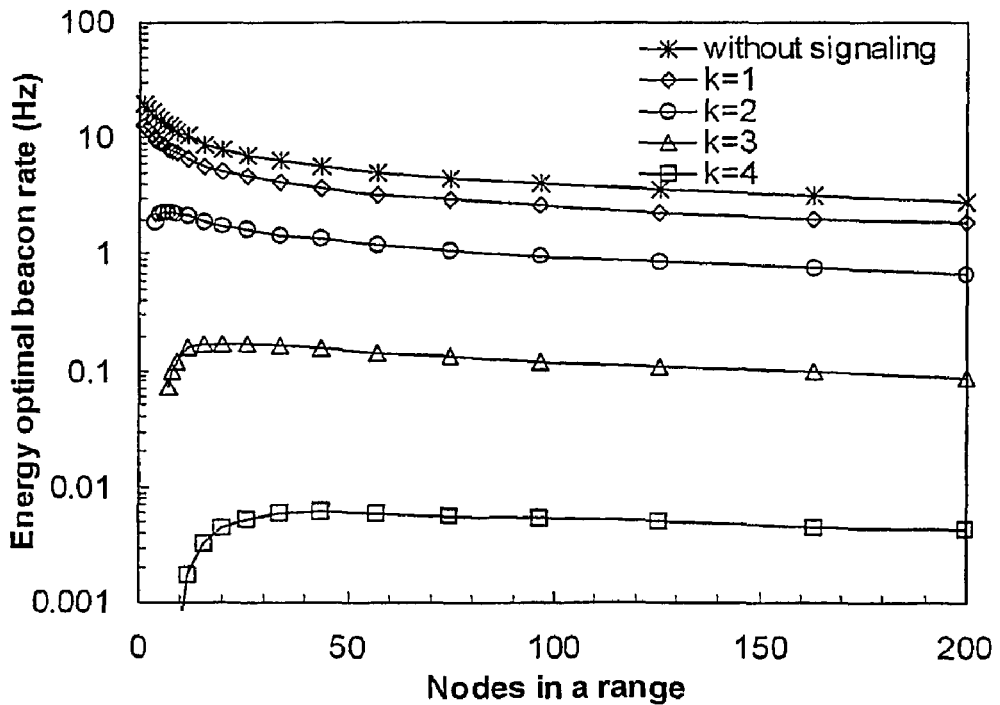
FIG. 15 illustrates the optimal beacon rate as a function of node density.

FIG. 15 shows the energy optimal beacon rate as a function of nodes in range. The results indicate that the neighbor discovery protocol can maintain high energy efficiency in both sparse and dense networks. In sparse networks the optimal beacon rate decreases, especially when k is 3 or 4, indicating higher energy efficiency. This is caused by fewer beacon receptions (u) until one beacon with sufficient signal strength is received. At higher node densities the required network scan time ($t_{ns}$) becomes shorter and lowers the optimal beacon transmission rate.

Further Considerations

In the description above we have assumed that a node maintains synchronization with—and thus receives SDUs from—k other nodes. For example in the situation of FIG. 9, where k equals 2, node A does not receive SDUs from node E even if that would be physically possible; node E is well within range. Node A even knows about the existence of node E, because it has received from node B an SDU that contains the information needed to receive beacon transmissions from node E. It would be possible to make node A additionally receive beacon transmissions every now and then also from node E, in the hope that this way node A would receive SDUs concerning even more neighboring nodes than it can by listening to only nodes B and D. This would further increase the probability that when the link to node B or D fails, node A can find a new node to synchronize with by only going through the SDUs in its memory. However, additional receiving of SDUs will significantly increase the amount of energy consumed in the node, so that such additional receptions should be carefully balanced against the overall energy budget of the WSN.

If the WSN includes Reduced Functionality Devices (RFDs), which are only capable of acting as subnodes, as well as Full Functionality Devices (FFDs), we should note that the invention may have a slight different impact on these. Since an RFD will never act as a headnode, it will never make any beacon transmissions. Thus it is not necessary to make an RFD capable of composing SDUs describing its neighbor nodes; it is sufficient that the RFD is capable of receiving SDUs from headnodes, storing received SDUs and utilizing stored SDUs in case of a link failure with a previous headnode. FFDs on the other hand should also be configured to compose SDUs on the basis of their observations about the beacon transmissions of neighboring headnodes, and to incorporate such SDUs in their own beacon transmissions.

An interesting consideration is, whether mobility should have any association with the status of a node as a headnode or subnode. Since headnodes are assumed to maintain a relatively large number of links with other nodes, but subnodes only need to maintain links with one or a few headnodes, in many cases it would have a positive effect on routing if the headnodes of the WSN were not mobile even if the subnodes were. If the headnodes are FFDs and subnodes RFDs, it could even be possible that the FFDs would not need to comprise the capability of utilizing stored SDUs for setting up new links, if it can be assumed that after deployment and initial set-up it would be very rare that headnodes would lose their previously established links with other headnodes. In WSNs where nodes can change their status, it is probably advantageous to define that a headnode that notices extensive changes in its environment deduces that it has gone mobile, and changes its status to subnode. We should also note that physical movement is not the only reason for changes in logical network topology. Since transmission power is minimized (often even link by link), even small movements of people or surrounding objects, or weather conditions in outdoor applications, may cause changes in signal propagation that necessitate changes in links between nodes.

The invention claimed is:

1. A node device (601) for a wireless sensor network, comprising:
    a receiver (651) for receiving transmissions from other nodes in said wireless sensor network,
    a controller (641) configured to selectively switch on said receiver (651) according to a timetable known to said controller (641), and
    a memory (642) configured to store information about other nodes in said wireless sensor network;
    wherein said node device (601) is configured to maintain synchronization with and receive beacon transmissions from another node in said wireless sensor network, said beacon transmissions conveying information related to controlling of network connections and data transfer between nodes,
    characterized in that said controller (641) is configured to read from received beacon transmissions information about neighboring nodes with which said node device (601) does not maintain synchronization, which information includes time information that describes timing of beacon transmissions from neighboring nodes in relation to the timing of beacon transmissions from the node with which the node device (601) received said beacon transmission, and to store such information into said memory (642), and said controller (641) is configured to utilize such stored information to selectively switch on said receiver (651) to attempt receiving a beacon transmission from such a neighboring node as a response to an observed failure in previously maintained synchronization.

2. A node device (601) according to claim 1, characterized in that said controller (641) is configured to read from received beacon transmissions channel information that describes channels on which neighboring nodes make beacon transmissions.

3. A node device (601) according to claim 1, characterized in that said controller (641) is configured to respond to an observed failure in previously maintained synchronization by
    selectively switching on said receiver (651) to attempt receiving a beacon transmission from a neighboring node, and establishing and maintaining synchronization with said neighboring node, if receiving a beacon transmission from said neighboring node succeeds with adequate link quality.

4. A node device (601) according to claim 3, characterized in that:
said node device (601) is configured to simultaneously maintain synchronization with and receive beacon transmissions from more than one other node in said wireless sensor network, and
said controller (641) is configured to respond to an observed failure in any of the simultaneously maintained synchronizations by:
selectively switching on said receiver (651) to attempt receiving a beacon transmission from a neighboring node, and
establishing and maintaining synchronization with said neighboring node, if receiving a beacon transmission from said neighboring node succeeds with adequate link quality.

5. A node device (601) according to claim 3, characterized in that if receiving a beacon transmission from said neighboring node does not succeed with adequate link quality, said controller (641) is configured to repeat selectively switching on said receiver (651) to attempt receiving a beacon transmission from other neighboring nodes about which the node device (601) has previously received information, until either receiving a beacon transmission from such a neighboring node succeeds with adequate link quality or there are no more such neighboring nodes from which the node device (601) had not yet tried to receive a beacon transmission.

6. A node device (601) according to claim 5, characterized in that if there are no more such neighboring nodes from which the node device (601) had not yet tried to receive a beacon transmission, but the node device (601) has received a beacon transmission from at least one neighboring node with inadequate link quality, said controller (641) is configured to selectively switch on said receiver (651) to attempt receiving a beacon transmission from that neighboring node from which a beacon transmission was received with best link quality.

7. A node device (601) according to claim 5, characterized in that if there are no more such neighboring nodes from which the node device (601) had not yet tried to receive a beacon transmission, and the node device (601) has not received any beacon transmission from neighboring nodes even with inadequate link quality, the controller (641) is configured to switch on said receiver (651) for a duration not longer than a beacon interval of said wireless sensor network, in order to perform a network scan.

8. A node device (601) for a wireless sensor network, comprising:
a receiver (651) for receiving transmissions from other nodes in said wireless sensor network,
a transmitter (651) for making transmissions to other nodes in said wireless sensor network,
a memory configured to store information about other nodes in said wireless sensor network, and
a controller (641) configured to selectively switch on said receiver (651) and said transmitter (651) according to a timetable known to said controller (641);
wherein said node device (601) is configured to maintain synchronization with and receive beacon transmissions from at least one other node in said wireless sensor network, characterized in that:
said controller (641) is configured to compose a synchronization data unit that contains information about such other node with which said node device (601) maintains synchronization, which information includes time information that describes timing of beacon transmissions from neighboring other nodes in relation to the timing of beacon transmissions from the node device that composes said synchronization data unit, and said controller (641) is configured to make said transmitter (651) transmit said synchronization data unit as a part of a beacon transmission,
said controller (641) is configured to read from received beacon transmissions information about neighboring other nodes with which said node device (601) does not maintain synchronization and to store such information into said memory, and
said controller (641) is configured to utilize such stored information to selectively switch on said receiver (651) to attempt receiving a beacon transmission from such a neighboring other node as a response to an observed failure in previously maintained synchronization.

9. A node device (601) according to claim 8, characterized in that:
said node device (601) is configured to simultaneously maintain synchronization with and receive beacon transmissions from more than one other node in said wireless sensor network,
said controller (641) is configured to compose synchronization data units that contain information about all other nodes with which said node device (601) maintains synchronization, and
said controller (641) is configured to make said transmitter (651) transmit said synchronization data units as parts of beacon transmissions.

10. A method for controlling the operation of a node device (601) in a wireless sensor network, comprising:
receiving beacon transmissions from another node in said wireless sensor network and maintaining synchronization with the node from which beacon transmissions are received, said beacon transmissions conveying information related to controlling of network connections and data transfer between nodes, and
storing information about other nodes in said wireless sensor network;
characterized in that the method comprises:
reading from received beacon transmissions information about neighboring nodes with which said node device (601) does not maintain synchronization, which information includes time information that describes timing of beacon transmissions from neighboring nodes in relation to the timing of beacon transmissions from the node from which said received beacon transmissions were received, and storing such information into said memory, and
on the basis of such stored information, selectively switching on (502) a receiver (651) in the node device (601) to attempt receiving a beacon transmission from such a neighboring node as a response to an observed failure (501) in previously maintained synchronization.

11. A method according to claim 10, characterized in that as a response to an observed failure (501) in previously maintained synchronization the method comprises:
selectively switching on (502) said receiver (651) to attempt receiving a beacon transmission from a neighboring node, and establishing and maintaining (507) synchronization with said neighboring node, if receiving a beacon transmission from said neighboring node succeeds with adequate link quality, if receiving a beacon transmission from said neighboring node does not succeed with adequate link quality, repeatedly selectively switching on (502, 503, 504) said receiver (651) to attempt receiving a beacon transmission from other neighboring nodes about which the node device (601) has previously received information, until either receiving a beacon transmission from such a neighboring node succeeds with adequate link quality or there are no more such neighboring nodes from which the node device (601) had not yet tried to receive a beacon transmission, if there are no more such neighboring nodes from which the node device (601) had not yet tried to receive a beacon transmission, but the node device (601) has received a beacon transmission from at least one neighboring node with inadequate link quality, selectively switching on (506) said receiver (651) to attempt receiving a beacon transmission from that neighboring node from which a beacon transmission was received with best link quality, and if there are no more such neighboring nodes from which the node device (601) had not yet tried to receive a beacon transmission, and the node device (601) has not received any beacon transmission from neighboring nodes even with inadequate link quality, switching on (509) said receiver (651) for a duration not longer than a beacon interval of said wireless sensor network, in order to perform a network scan.

12. A method for controlling the operation of a node device (601) in a wireless sensor network, comprising:

receiving beacon transmissions from at least one other node in said wireless sensor network and maintaining synchronization with the other node from which beacon transmissions are received, said beacon transmissions conveying information related to controlling of network connections and data transfer between nodes, characterized in that the method comprises:

composing a synchronization data unit that contains information about such other node with which said node device (601) maintains synchronization, which information includes time information that describes timing of beacon transmissions from neighboring other nodes in relation to the timing of beacon transmissions from the node device that composes said synchronization data unit, transmitting (401, 402, 403) said synchronization data unit as a part of a beacon transmission, reading from received beacon transmissions information about neighboring other nodes with which said node device (601) does not maintain synchronization and storing such information into said memory, and on the basis of such stored information, selectively switching on (502) a receiver (651) in the node device (601) to attempt receiving a beacon transmission from such a neighboring other node as a response to an observed failure (501) in previously maintained synchronization.

13. A computer program product stored on a non-transitory computer readable medium comprising computer program code means, when said program is loaded, to make the computer execute a procedure to:

make a node device (601) of a wireless sensor network receive beacon transmissions from another node in said wireless sensor network and maintain synchronization with the node from which beacon transmissions are received, said beacon transmissions conveying information related to controlling of network connections and data transfer between nodes, and make said node device (601) store information about other nodes in said wireless sensor network;

characterized in that the computer program product comprises computer program code means, when said program is loaded, to make the computer execute a procedure to:

read, from beacon transmissions that said node device (601) received, information about neighboring nodes with which said node device (601) does not maintain synchronization, which information includes time information that describes timing of beacon transmissions from neighboring nodes in relation to the timing of beacon transmissions from the node from which said beacon transmissions were received, store such information into said memory, and on the basis of such stored information, selectively switch on a receiver (651) in the node device (601) to attempt receiving a beacon transmission from such a neighboring node as a response to an observed failure in previously maintained synchronization.

14. A computer program product according to claim 13, characterized in that the computer program product comprises computer program code means, when said program is loaded, to make the computer execute a procedure to:

compose a synchronization data unit that contains information about such other node with which said node device (601) maintains synchronization, which information includes time information that describes timing of beacon transmissions from neighboring other nodes in relation to the timing of beacon transmissions from the node device that composes said synchronization data unit, and make the node device (601) transmit said synchronization data unit as a part of a beacon transmission.

\* \* \* \* \*